(12) United States Patent
Brueck et al.

(10) Patent No.: US 12,446,840 B2
(45) Date of Patent: Oct. 21, 2025

(54) GUIDANCE FOR POSITIONING A PATIENT IN MEDICAL IMAGING

(71) Applicant: KONINKLIJKE PHILIPS N.V., Eindhoven (NL)

(72) Inventors: Heiner Matthias Brueck, Pinneberg (DE); Stewart Matthew Young, Hamburg (DE); André Goossen, Eldena (DE); Sven Kroenke, Hamburg (DE); Daniel Bystrov, Hamburg (DE); Jens Von Berg, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 249 days.

(21) Appl. No.: 18/037,573

(22) PCT Filed: Nov. 12, 2021

(86) PCT No.: PCT/EP2021/081465
§ 371 (c)(1),
(2) Date: May 18, 2023

(87) PCT Pub. No.: WO2022/106305
PCT Pub. Date: May 27, 2022

(65) Prior Publication Data
US 2023/0404495 A1    Dec. 21, 2023

(30) Foreign Application Priority Data
Nov. 23, 2020   (EP) .................................... 20209121

(51) Int. Cl.
*G06K 9/00* (2022.01)
*A61B 6/00* (2006.01)
(Continued)

(52) U.S. Cl.
CPC ............ *A61B 6/0492* (2013.01); *A61B 6/547* (2013.01); *G06T 7/74* (2017.01); *G06T 2207/20224* (2013.01); *G06T 2207/30004* (2013.01)

(58) Field of Classification Search
CPC ........... A61B 6/04; A61B 6/0492; A61B 6/06; A61B 6/463; A61B 6/505; A61B 6/547;
(Continued)

(56) References Cited

U.S. PATENT DOCUMENTS 10,853,684 B1 * 12/2020 Sieracki ................. H04N 23/64
12,080,001 B2 *  9/2024 Ni .......................... A61B 90/37
(Continued)

OTHER PUBLICATIONS

PCT International Search Report, International application No. PCT/EP2021/081465, Feb. 17, 2022.
Sakamoto M. et al., "Automated Segmentation of Hip and Thigh Muscles in Metal Artifact Contaminate CT Using CNN", Joint International Workshop on Advanced Image Technology (IWAIT) and International Forum on Medical Imaging in Asia (IFMIA), Proceedings of SPIE, vol. 11050, 2019.
(Continued)

*Primary Examiner* — Avinash Yentrapati
(74) *Attorney, Agent, or Firm* — Larry Liberchuk

(57) ABSTRACT

A computer-implemented method for positioning a subject in medical imaging, comprising: receiving a first image (20) of a region of interest (14, 16) of the subject (S10); determining first positioning data based on the first image (20), wherein the first positioning data indicates an alignment of the region of interest (14, 16) relative to a first image acquisition unit used to acquire the first image (20) (S20); determining guidance data based on the first positioning data, wherein the guidance data comprises a guidance for an alignment of the region of interest (14, 16) relative to a second image acquisition unit used to acquire a second image (60) from a current alignment to a target alignment, wherein the target alignment is to correspond to that derived from the first positioning data (S30); providing the guidance data for acquiring the second image (60) (S40).

15 Claims, 3 Drawing Sheets

(51) Int. Cl.
*A61B 6/04* (2006.01)
*G06T 7/73* (2017.01)

(58) Field of Classification Search
CPC . G06T 2207/20224; G06T 2207/30004; G06T 7/74
See application file for complete search history.

(56) References Cited

U.S. PATENT DOCUMENTS

| | | | |
|---|---|---|---|
| 2003/0225325 A1* | 12/2003 | Kagermeier | A61N 5/1049 600/407 |
| 2015/0051489 A1* | 2/2015 | Caluser | A61B 8/13 600/440 |
| 2018/0116613 A1* | 5/2018 | Von Berg | A61B 8/40 |
| 2019/0122330 A1 | 4/2019 | Saget | |
| 2019/0183439 A1* | 6/2019 | Joerger | A61B 6/545 |
| 2020/0188026 A1 | 6/2020 | de Souza | |

OTHER PUBLICATIONS

Von Berg et al., "Temporal Subtraction of Chest Radiographs Compensating Pose Differences", Medical Imaging 2011: Image Processing. vol. 7962, International Society for Optics and Photonics, 2011.

Brueck M. et al., "Robust Quality Assessment for Skeletal Radiographs Combining Convolutional Neural Networks and Statistical Atlases", 2nd Online Conference to Unite Philips AI (OCUPAI'20), May 18-20, 2020 (Online), https://share.philips.com/sites/OCUPAI20/SitePages/OCUPAI'20.aspx.

Bier B. et al., "Learning to Detect Anatomical Landmarks of the Pelvis in X-Rays from Arbitrary Views", International Journal of Computer Assisted Radiology and Surgery, vol. 14, issue 9, pp. 1463-1473, Sep. 2019.

* cited by examiner

GUIDANCE FOR POSITIONING A PATIENT IN MEDICAL IMAGING

FIELD OF THE INVENTION

The present invention relates to a computer-implemented method for positioning a subject in medical imaging, a device for positioning a subject in medical imaging, and a computer program element for carrying out steps of such a method.

BACKGROUND OF THE INVENTION

Imaging techniques are used in medical technology for providing visual representations of the interior of a subject, e.g. for medical diagnosis. The representation and/or diagnosis comprises, for example, a first determination of a position and an extent of a fracture of a patient's arm bone in the first image as well as in the course of the recovery process in follow-up images taken at time intervals of, for example, two months. A clinical expert or physician, preferably a radiologist, will then assess the healing of the fracture based on the images at the various stages of recovery.

The quality of the different images is crucial for their assessment and may therefore lead to misinterpretations of the images.

SUMMARY OF THE INVENTION

It has been found, that there may be a need for improving image quality in medical imaging. In particular, there may be a need for an improved method for acquiring high quality images in medical images. The object of the present invention is solved by the subject-matter of the independent claims, wherein further embodiments are incorporated in the dependent claims.

According to a first aspect, a computer-implemented method is provided for positioning a subject in medical imaging, comprising: receiving a first image of a region of interest of the subject; determining first positioning data based on and/or from the first image, wherein the first positioning data indicates an alignment of the region of interest relative to a first image acquisition unit used to acquire the first image; determining guidance data based on the first positioning data, wherein the guidance data comprises a guidance for an alignment of the region of interest relative to a second image acquisition unit used to acquire a second image from a current alignment of the region of interest to the second image acquisition unit to a target alignment of the region of interest to the second image acquisition unit, wherein the target alignment is to correspond to an alignment of the region interest relative to a first image acquisition unit derived from the first positioning data; providing the guidance data for acquiring the second image.

As used herein, the distinction between first and second acquisition unit may refer to the first acquisition unit being used at a first time to acquire the first image at a first time, e.g. right after surgery etc., and the second unit being used at a later, second time to acquire the second image, e.g. In this regard, it is helpful if the alignment of the region of interest to the second acquisition unit, i.e., the alignment to the image acquisition unit for acquiring the second image at the second time, is as similar or the same as possible to the alignment of the region of interest to the first image acquisition unit, i.e., as the alignment to the image acquisition unit for image acquisition at the first time, was at that time. A preferred or ideal alignment may be referred to as the target alignment. A time interval between acquisition of the first image and the second image may be a period of time during which the subject may have changed its alignment with the image acquisition unit at least once because he got up, left the room, left the entire imaging facility, etc. For example, the second image may be acquired after hours, days, weeks, months or years with respect to the first image. Accordingly, it is not trivial to achieve a similar or the same alignment for the acquisition of the second image as for the acquisition of the first image. The second image may also be referred to as a follow-up image, e.g. to be taken for examination and/or to evaluate etc. any changes of or within the region of interest, such as evaluating a recovering process or the like. As used herein, the first image and the second image may be both full images, in contrast to a preview or simulated image, for which the same image acquisition technique is used.

It is noted that the first image acquisition unit and the second image acquisition unit may be of the same type, i.e. both may utilize a same image acquisition technique as described below, e.g. CT imaging, X-Ray imaging, MRT imaging, and digital photography. They may be located in a same imaging facility or may be remotely arranged to each other.

The term subject is to be understood broadly in the present case and may comprise any human and animal subject. The term region of interest means in the present case a subarea of the subject. Preferably, the term region of interest may comprise bones (e.g. forearm bone), joints (e.g. knee joint), organs (e.g. lung), and tissue (e.g. abdominal tissue). However, the term is not limited to these examples. The term medical imaging is to be understood broadly in the present case and may comprise any medical imaging technique that is configured to image a subject for medical purposes and/or examination. The term may comprise CT imaging, X-Ray imaging, MRT imaging, and digital photography. Preferably, the term relates to CT imaging and X-Ray imaging. The term first positioning data means in the present case positioning data indicating a certain position, alignment, orientation, or the like, used to acquire the first image. The term positioning data in general relates to any data indicating a certain position, alignment, orientation, or the like, used for preparation the imaging process and/or acquiring the image itself of the region interest of the subject. The positioning data may preferably comprise spatial data of an alignment, a position, an orientation, or the like, between the region of interest and the image acquisition unit. The region of interest may be a joint, a bone, a tissue section, e.g. an ankle or the like, and may be described as multi body model, wherein every body may have 3 translatory and 3 rotatory degrees of freedom. The image acquisition unit may comprise a source configured for emitting radiation and a detection unit configured for detecting the radiation. The positioning data of the acquisition unit may comprise values for rotational and translatory degrees of freedom. The positioning data may be described in absolute values related to a coordinate system of the acquisition unit (e.g. origin coordinate system of CT imaging unit) or may be described in relative values that relate to the acquisition unit in relation to the region of interest (e.g. distance of 500 mm between source of image acquisition unit and knee ankle in x-direction). The term positioning data may comprise one or more process parameters of the acquisition unit (e.g. a collimation window) and an optical path of radiation and intersections of radiation and region of interest. The term guidance data is to be understood broadly in the present case and may comprise any kind of data, which assists a person to align the region of interest to the acquisition unit, or vice versa, for the second image or a subsequent or further image. Thereby, one goal can be to achieve as exact a match as possible between the alignment for the second or subsequent image and the alignment used for the previous first image. Preferably, the guidance data relates to a difference between the positioning data of the current alignment and the target alignment. Preferably, the target alignment may at least largely correspond to the alignment as it was used to acquire the first image and/or as it is contained in the first positioning data.

In other words, the guidance comprise a change recommendation of a positioning parameter (e.g. an angle) related to. The guidance data may be provided via a table, a figure, an audio signal, an animation, a visualization. The guidance data may be continuously determined. The term current alignment comprises in the present case an actual present alignment or an ideal alignment between the region of interest and the image acquisition unit. The term target alignment means in the present case an alignment that represents the alignment of the first image. The target alignment is used for acquiring the second or further images. The term based on the first image means in the present case that the first positioning data are derived from the first image.

In other words, the present disclosure is based on the knowledge that is difficult for a clinical expert and/or physician to evaluate two different images in case of different alignments during image acquisition between the image acquisition unit and the region of interest. Different alignments result in different representations, e.g. different projections, of the region of interest in relations to the image acquisition unit. Hence, the clinical expert and/or physician cannot evaluate without doubt, whether the difference between the first image and second image results from e.g. the healing process or only from the different alignments used for acquiring the first and second or subsequent images. This may lead to a further necessary imaging of the region of interest or to a wrong assessment of the image(s), and/or to a wrong diagnosis. The present disclosure solves this problem by determining the positioning data of the first image, i.e. the alignment used for acquiring the first image, deriving the guidance data from the positioning data, and providing the guidance data for acquiring the second image, preferably by providing an alignment to be used for acquiring the second or subsequent image at least largely corresponding to the alignment used for acquiring the previous first image. Hence, the second image may be acquired with at least nearly the same or exact the positioning data assigned to the acquisition of the first image. Due to the same applied positioning data for the first image and the second image, resulting in or corresponding to the at least nearly the same alignment for acquiring the images, the comparability of the first image and the second image increases and therefore the reliability of the first image and the second image and of the corresponding evaluation. The efficiency of the imaging process may therefore be increased by the elimination of unnecessary additional images due to the increased comparability of the second image with the first image.

According to an embodiment, the first positioning data may comprise one or more of an axis, an angle, a distance, collimation opening, central beam intersection with bone and flexion of the region of interest. The expression one or more of means in the present case that for example two axis and one angle are considered. In other words, the selection considers 1 to n positioning data parameter of a group of positioning data, wherein n represents an amount of possible positioning data parameters. The axis may be a translatory axis (e.g. x-, y-, and z-axis) of the acquisition unit and/or of the region of interest. The distance may be a distance between the region of interest and a source of the image acquisition unit in a translatory direction described by the axis and a value of the distance. The angle may be an angle around an axis described by the axis and a value of the angle. The angle may also be a joint angle of the region of interest (e.g. knee joint). The term collimation opening relates in the present case to an opening width or height of a collimator that is configured to adapt directions of radiation and/or to reduce or to increase a spatial cross section of a radiation beam. The collimation opening affects therefore a field of view of the region of interest. An under-collimated image may show to much unnecessary information of neighboring regions of the region of interest. An over-collimated image may only show a portion of the region of interest. At every intersection of the central beam with for example the structure of a bone, the central beam is bent and flexed, which may cause a change of the beam direction and/or a change of a radiation intensity of the beam. The positioning data derived from the first image provides the information of the alignment in the first image. The more precisely the positioning data of the first image is determined and used to generate the second image, the greater may be the comparability between the first and second image.

According to an embodiment determining the first positioning data may comprise: reading the first positioning data from meta data of the first image, wherein the meta data of the first image comprises at least the positioning data of the first image; and/or analyzing the first image using an image analysis algorithm. The term meta data is to be understood broadly in the present case and comprises any data related to the image, such as time stamp, patient ID, used image acquisition unit etc. Preferably, the meta data comprises positioning data of the first image. The meta data may attached to the first image in e.g. DICOM format or in text form. This may be advantageous in case the image acquisition process of the first image comprises the possibility of directly analyzing the first image and in case this possibility is not available in the imaging process for the second image. Hence, it increases the flexibility respectively the applicability of the method. Analyzing the first image using an analysis algorithm may be advantageous, since it also increases the flexibility of the method in case the analyzing method is not available in the first imaging process. The analysis algorithm may include segmenting at least a portion the first image. Additionally or alternatively the analysis algorithm comprises registering of the first image with an anatomy atlas. The segmentation of the first image may be performed using one or a combination of the following segmentation techniques: region growing, Watershed transform, edge detection, shape model, appearance model and hand-segmentation using user interaction with the graphical user interface. Additionally or alternatively, the segmentation may be performed using an artificial neural network. The segmentation may be performed automatically or interactively (i.e. requiring user intervention). In interactive segmentations, a computer system may receive user input, which is indicative of one or more parameters of a location, an orientation and/or an outer contour of an image region. The artificial neural network may be trained using segmented images, in particular performed by interactive segmentation. The artificial neural network may include an input layer, one or more intermediate layers and an output layer. The artificial neural network may be configured as a convolutional neural network, in particular as a deep convolutional neural network. The atlas may include a statistically averaged anatomical map of one or more body portions. At least a portion of the atlas may be indicative of or may represent a two-dimensional or three-dimensional shape of the region of interest. A description of an analysis algorithm, which may be used for determining the positioning data of the first image and/or the second image in the embodiments described in the present disclosure, is described in the article "Learning to detect anatomical landmarks of the pelvis in X-rays from arbitrary views", written by Bastian Bier, Florian Goldmann, Jan-Nico Zaech, Javad Fotouhi, Rachel Hegeman, Robert Grupp, Mehran Armand, Greg Osgood, Nassir Navab, Andreas Maier, Mathias Unberath and published in International Journal of Computer Assisted Radiology and Surgery (2019). The content of this article is incorporated by reference herein in its entirety.

In an embodiment, providing the guidance data may comprise at least one visual representation of the current alignment and/or the target alignment. The visual representation may displayed on a screen in an image acquisition room of a hospital. The visual representation may show an optical path resulting from the alignment (e.g. an arrow). The visual representation of the current alignment and the target alignment may be displayed on the same screen in one window or in separate windows. The visual representation of the current alignment and/or the target alignment may advantageously simplify the adaption process from the current alignment to the target alignment, since the user can watch the differences on the screen.

In an embodiment, providing the guidance data may comprise at least a visual representation of the region of interest. The visual representation may be an average representation of the region of interest (e.g. a joint, such as a knee joint), which is used for all subjects, or a personalized representation of the region of interest (e.g. forearm bone) based on patient data. The visual representation of the region of interest may advantageously simplify the adaption process from the current alignment to the target alignment since the user can watch on the screen how to adapt the position of the region of interest instead of mental imagination. The guidance data may further comprise a visual representation of the image acquisition unit. In this content, the visual representation comprises preferably an absolute value. The absolute value may be for example an angle (e.g. 100 difference between the current alignment and the target alignment) shown in numbers and/or tables. The visual representation is not limited to one absolute value. This may be advantageous for the adaption process for a user due to a reduction of complexity.

In an embodiment, the visual representation may be updated dependent on the current alignment. This may be advantageous in terms of optimization of the current alignment in order to fit the target alignment. The visual representation may preferably continuously updated, preferably every minute, or 30 s, or 15 s, or 1 s, etc. The guidance data may further comprise a sequence recommendation for adapting the positioning data. This may be advantageous since the positioning data may interact disadvantageously (e.g. when one parameter of the positioning data has the target value, the one parameter of the positioning data may constrain the adaption of another parameter of the positioning data).

According to an embodiment, the first image acquisition unit may be used at a first time to acquire the first image, and the second image acquisition unit is used at a second time, which is after the first time, to acquire the second image. As described above, the second image may be a follow-up or subsequent image to the first image.

In an embodiment, the first image acquisition unit and the second image acquisition unit utilize a same image acquisition technique.

In an embodiment, the guidance data may comprise a preview image of the region of interest based on the current alignment, wherein the preview image is a simulated image that would be acquired with the current alignment in an actual image acquisition using the second image acquisition unit. The simulated image may be derived by a 3D model of the region interest and current alignment. The 3D model of the region of interest may be a static average model that fits for every person independent from personal data or a dynamic model that is adapted in dependency of personal data of a patient (e.g. gender, age, height, etc.). Based on the current alignment and 3D model a calculation algorithm calculates a forward projection that would be imaged in case for the current alignment in reality. This may be advantageous in terms of balancing whether the current alignment may already be sufficient for a further evaluation of the first and second image (e.g. the target alignment is not reachable due further new conditions of the patient). In this content, the method is provided, wherein the preview image is preferably updated dependent on the current alignment. This may be advantageous in terms of optimizing the current alignment. In this content, the preview image is preferably adapted continuously, for example after 3 minutes, 1 minute, 30 s, 15 s, or 1 s, etc. This may simplify the preparation process and helps to fit the target alignment. The simulated image representing the X-ray image projection may be a pseudo X-ray image generated from a 3D Model that is achieved by performing a parallel or projective projection of the 3D model onto a virtual detector plane. This may be advantageous for virtually optimizing positioning data.

In an embodiment, the current alignment may be derived from at least one optical sensor and/or a control signal of the image acquisition unit. The optical sensor may measure one or more positions of the region of interest. Based on the measurements positioning data such as angle, distance etc. are derived. The control signal may indicate a position and/or orientation of the image acquisition unit (i.e. source and/or detector). This may be advantageous since every adaption of the alignment is visible and serves for optimizing the adaption from the current alignment to the target alignment.

In an embodiment, the current alignment may be a simulated representation thereof. The simulated representation enables a user (e.g. a technician) to virtually optimize the current alignment by changing the position, orientation etc. of the region of interest and/or the image acquisition unit. This may be advantageous in order to prepare an actual treatment. This may further be advantageous to serve as a training basis for the user (e.g. a technician or a MTRA).

In an embodiment, the method may further comprise calculating a subtraction image between the first image and the second image comprising one or more positional differences between the first image and the second image. The term positional differences means in the present case that for example a bone is in the second image in another position respectively pose compared to the first image. This may lead to problems for evaluating both images. The subtraction image is calculated by registering both images using key bone structures visible in the region of interest in both images. In this content, the method preferably further comprises highlighting the one or more positional differences in the first and/or second image. The subtraction image may further reveal interval changes. The term interval change comprises in the present case tumor growth or shrinkage, implant loosening, fracture healing, cartilage degeneration, bone alignment correction, and change of device positioning (e.g. screws, rods, and fixation compared to pre-operative image or pre-injury image). This may be advantageous for evaluating both images and/or a change of the content of the region of interest. A description of a calculation of subtraction images, which may be used for the embodiments described in the present disclosure, is described in the article "Temporal subtraction of chest radiographs compensating pose differences", written by Jens von Berg, Jalda Dworzak, Tobias Klinder, Dirk Manke, Hans Lamecker, Stefan Zachow, Cristian Lorenz and published in SPIE Medical Imaging 2011. The content of this article is incorporated by reference herein in its entirety.

A further aspect relates to a device for positioning a subject in medical imaging, comprising: a receiving unit configured to receive a first image of a region of interest of the subject; a first determining unit configured first positioning data based on the first image, wherein the first positioning data indicates an alignment of the region of interest relative to a first image acquisition unit used to acquire the first image; a second determining unit configured to determine guidance data based on the first positioning data, wherein the guidance data comprises a guidance for an alignment of the region of interest relative to a second image acquisition unit used to acquire a second image from a current alignment to a target alignment, wherein the target alignment is to correspond to that derived from the first positioning data; a providing unit configured to provide the guidance data for acquiring the second image. The receiving unit and/or the determining units and/or the acquisition unit and/or providing unit may be distributed on different hardware units or combined in a single hardware. The first determining unit und the second determining unit may be one hardware unit. Further, the receiving unit and/or the determining units and/or the acquisition unit and/or providing unit may be virtual units (i.e. software units).

Optionally, the device may be configured to carry out the method according to the first aspect.

A further aspect relates to a computer program element configured to carry out steps of the method described above. The computer program element might be stored on a computer unit, which might also be part of an embodiment. This computing unit may be configured to perform or induce performing of the steps of the method described above. Moreover, it may be configured to operate the components of the above described device. The computing unit can be configured to operate automatically and/or to execute the orders of a user. A computer program may be loaded into a working memory of a data processor. The data processor may thus be equipped to carry out the method according to one of the preceding embodiments. This exemplary embodiment of the invention covers both, a computer program that right from the beginning uses the invention and computer program that by means of an update turns an existing program into a program that uses invention. Further on, the computer program element might be able to provide all necessary steps to fulfill the procedure of an exemplary embodiment of the method as described above. According to a further exemplary embodiment of the present invention, a computer readable medium, such as a CD-ROM, USB stick or the like, is presented wherein the computer readable medium has a computer program element stored on it which computer program element is described by the preceding section. A computer program may be stored and/or distributed on a suitable medium, such as an optical storage medium or a solid state medium supplied together with or as part of other hardware, but may also be distributed in other forms, such as via the internet or other wired or wireless telecommunication systems. However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

These and other aspects of the present invention will become apparent from and elucidated with reference to the embodiments described hereinafter.

BRIEF DESCRIPTION OF THE DRAWINGS

Exemplary embodiments of the invention will be described in the following drawings.

DETAILED DESCRIPTION OF EMBODIMENTS

Figure 1:
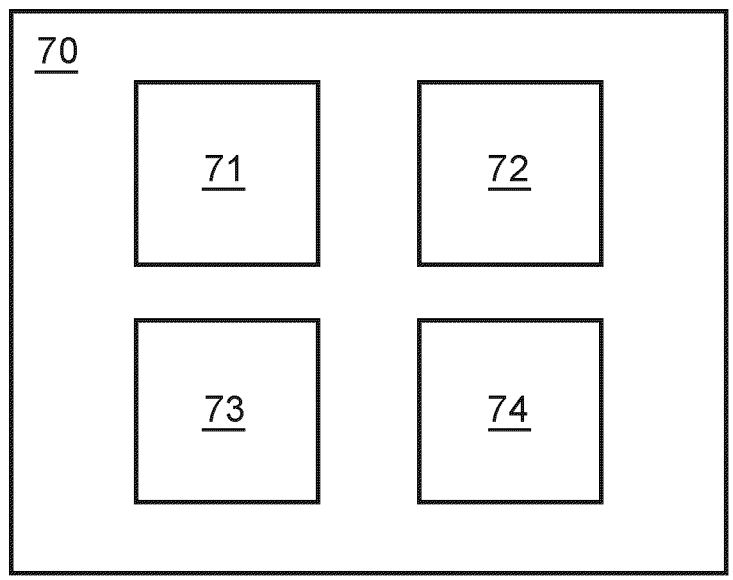
FIG. 1 is schematic of a device according to an embodiment of the present disclosure.

FIG. 1 is schematic of a device according to an embodiment of the present disclosure. The device 70 is configured for positioning a subject in medical imaging. The device 70 comprises a receiving unit 71 configured to receive a first image of a region of interest of the subject; a first determining unit 72 configured first positioning data based on the first image, wherein the first positioning data indicates an alignment of the region of interest relative to a first image acquisition unit used to acquire the first image; a second determining unit 73 configured to determine guidance data based on the first positioning data, wherein the guidance data comprises a guidance for an alignment of the region of interest relative to a second image acquisition unit used to acquire a second image from a current alignment to a target alignment, wherein the target alignment is to correspond to that derived from the first positioning data; a providing unit 74 configured to provide the guidance data for acquiring the second image. The device 70 may be a data processing unit with one or more interfaces configured to exchange data.

Figure 2:
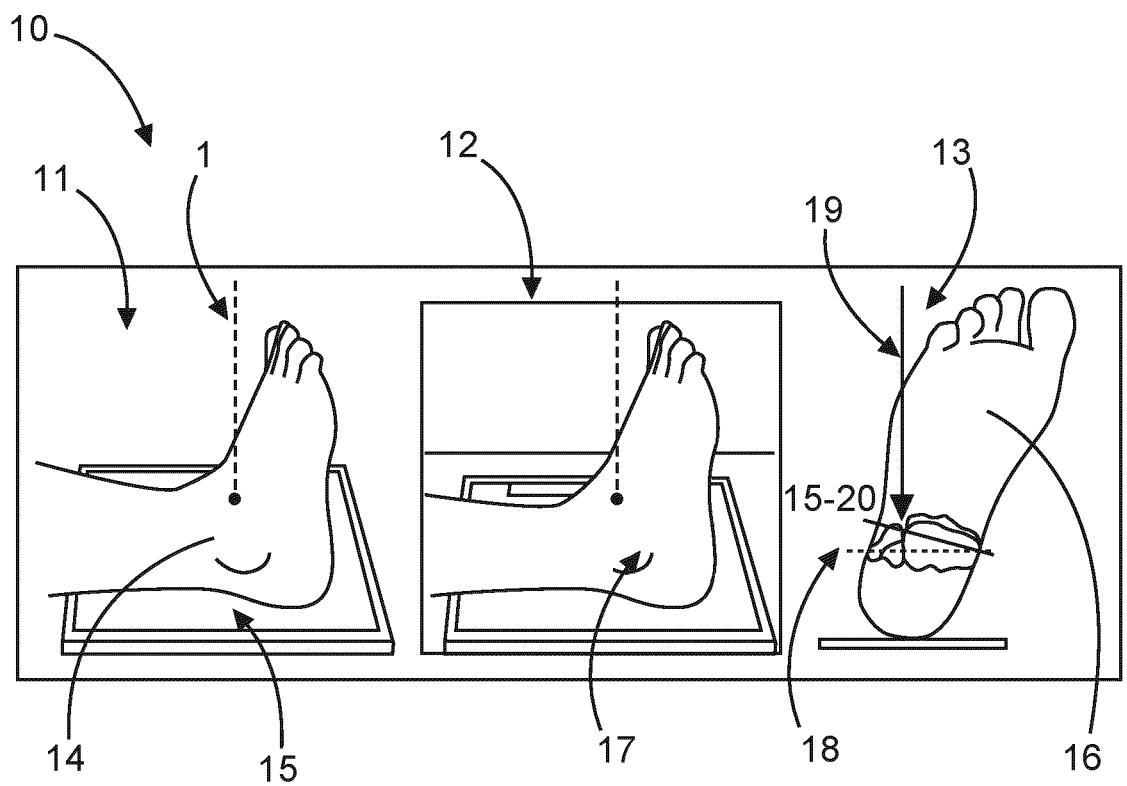
FIG. 2 is a schematic of an optimal X-ray projection following radiological guidelines.

FIG. 2 is a schematic of an optimal X-ray projection following radiological guidelines, as used in e.g. hospitals in general. The radiological guidelines assist a MRTA in order to achieve the best image quality as possible. The schematic 10 shows a sketched side view 11, a real side view 12, and a sketched back view 13, wherein all three views show as region of interest a foot 14, 16, 17 of a subject. The foot is positioned on an X-ray detector 15. The sketched line 1 represents the central beam of a radiation path 1 of the image acquisition unit, in the present case an X-ray tube (not shown). The sketched side view 11 and the real side view according to this exemplary guide the MRTA to position the foot in a target alignment, in particular the ankle in the middle of the X-ray detector 15, which relates to a translatory information as recommendation for the MRTA. The back view 13 comprises as recommendation a rotation angle 18 with a value recommendation of 15 to 20° in relation to the radiation path 19. The orientation of the foot 16 is to turn over 15 to 20° in order to achieve proper results according to the radiological guidelines for this specific example.

Figure 3:
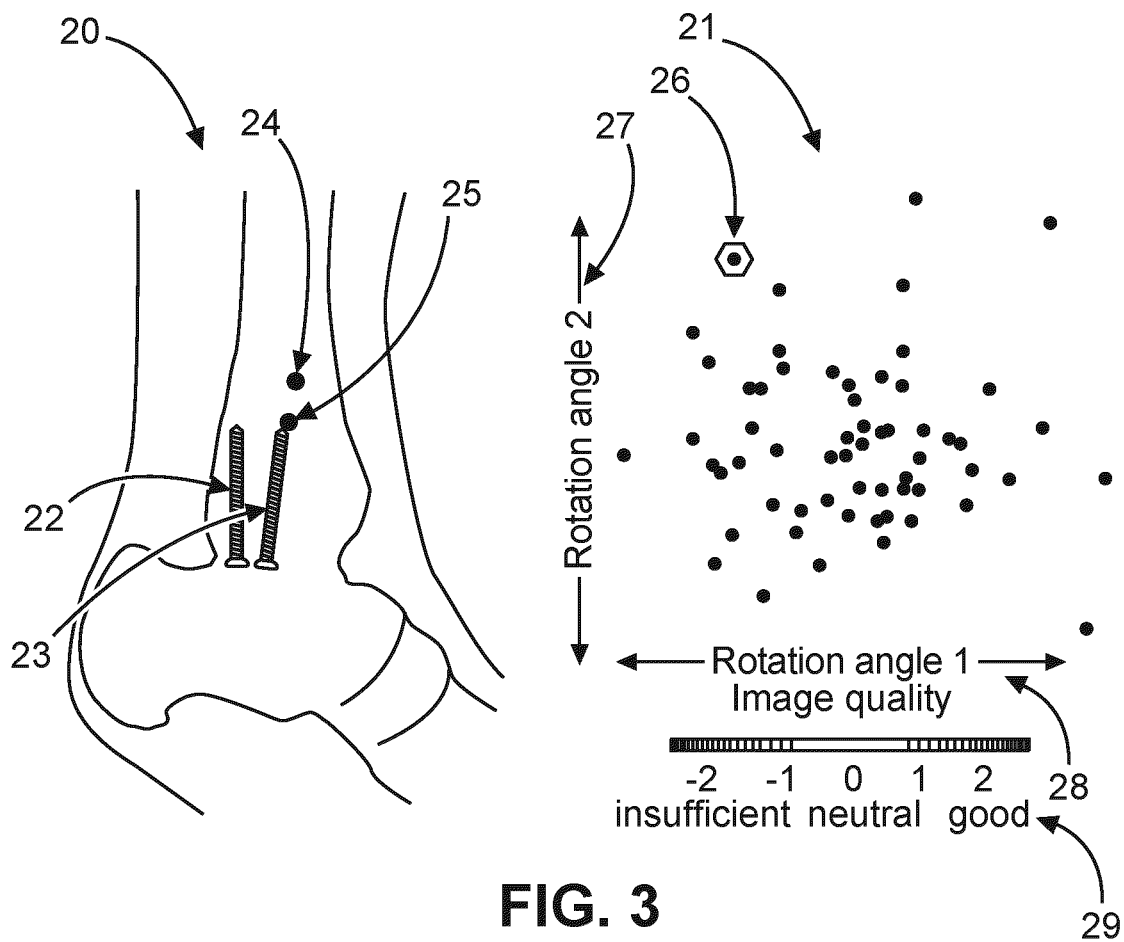
FIG. 3 shows a first image (left) and a corresponding quality space-diagram (right)

FIG. 3 shows a first image 20 (left) and a corresponding quality space-diagram 21 (right) according to an embodiment of the present disclosure. The first image is acquired with a first alignment that should be the same as the target alignment of the radiology guidelines. However, the first alignment deviates from the target alignment of the radiology guidelines. The first image is an X-ray image of the foot 14, 16 shown in FIG. 2. By way of example, the first image 20 comprises several screws 22, 23, 24 and 25. The first image 20 may be imaged by a MRTA in consideration of the radiology guidelines. The quality space-diagram 21 comprises two axis 27, 28. The first axis 27 represents in this example a rotation angle 1 and the second axis 28 represents in this example a rotation angle 2. The rotation angle 1 represents in this example rotation angle 18 from FIG. 1. The quality space diagram 21 further comprises an image quality scale 28. The image quality scale 28 relates to the quality of the image, wherein the image quality scale comprises in this example the levels insufficient, neutral, and good and a number coding from −2 to 2. The polygon 26 relates to the quality of the first image 20. As can be seen, the quality is in the example insufficient. This may be caused due improper preparation of the position of the patient (e.g. wrong rotation angle 1 and 2) or a movement of the patient during imaging for example. The other points in the quality space diagram represent former images. The quality space diagram may be advantageous in terms of analysis for images and may reveal whether an image has to be imaged again. The corresponding rotation angle 1 and rotation angle 2 of the first image are determined via an analysis algorithm as described in the article "Learning to detect anatomical landmarks of the pelvis in X-rays from arbitrary views", written by Bastian Bier, Florian Goldmann, Jan-Nico Zaech, Javad Fotouhi, Rachel Hegeman, Robert Grupp, Mehran Armand, Greg Osgood, Nassir Navab, Andreas Maier, Mathias Unberath and published in International Journal of Computer Assisted Radiology and Surgery (2019). The content of this article is incorporated by reference herein in its entirety.

Figure 4:
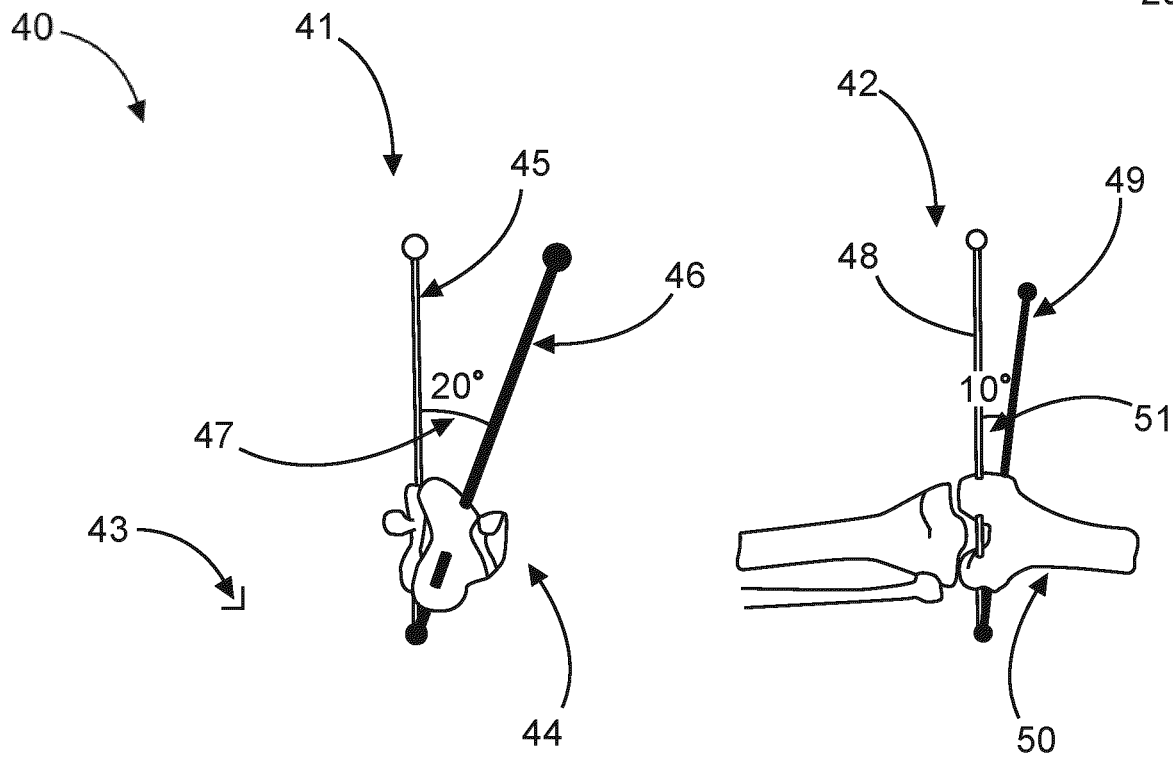
FIG. 4 shows guidance data for imaging a leg.

FIG. 4 shows guidance data for imaging a leg. The guidance data comprises in this example a visual representation 40 of a leg for leg rotation (left) and tube rotation (right) according to an embodiment of the present disclosure. The visual representation for leg rotation 41 comprises a coordinate system 43, a representation of the region of interest 44, in this case the leg 44, a representation of the current alignment 45, a representation of the target alignment 46, and a visual representation 47 of the rotation angle 17 between current alignment 45 and target alignment 46. The target alignment 46 represents in this case the alignment of the first image 20. The visual representation for tube rotation 41 comprises a visual representation of the region of interest 50, a leg, from another perspective, the visual representation of the current alignment 48 and the visual representation of the target alignment 49, as well as a rotation angle 51 of the tube. In this example, the patient's leg should be rotated 20° internally and the tube 10° caudal relative to the current alignment in order to reproduce the first X-ray image.

Figure 5:
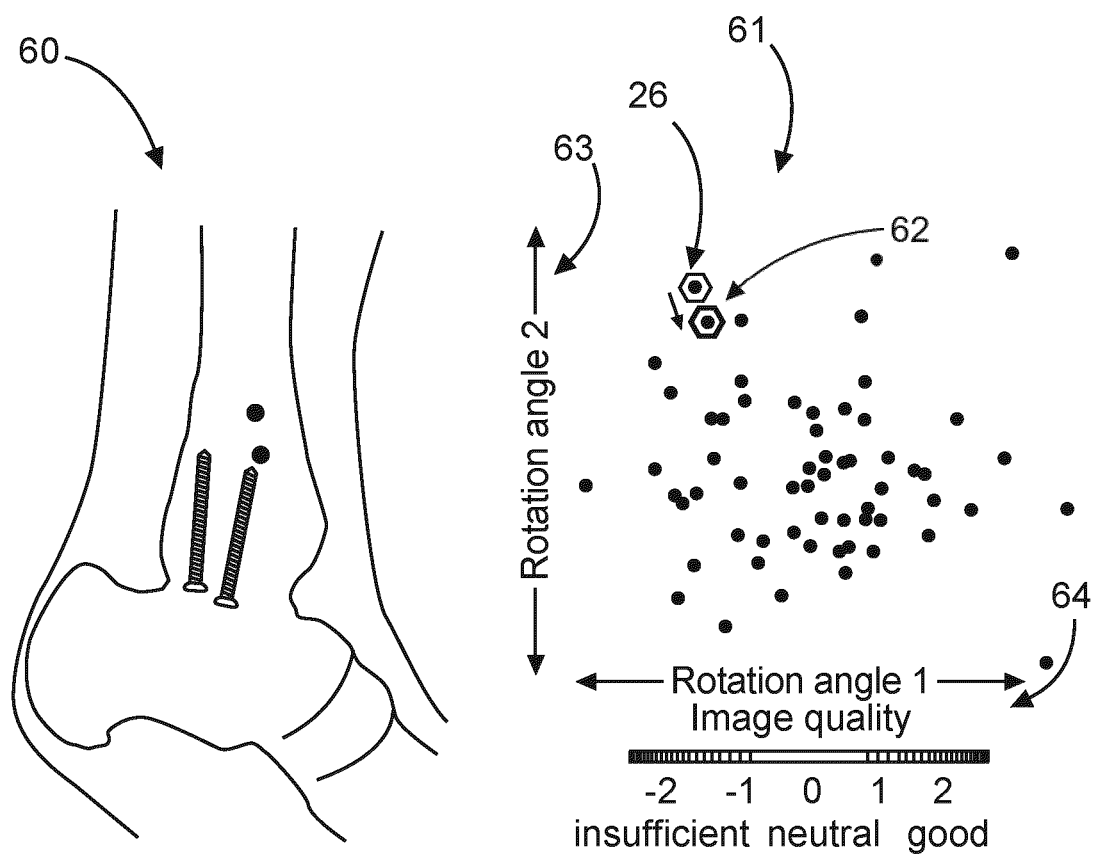
FIG. 5 shows a second image (left) and a corresponding quality space diagram (right)

FIG. 5 shows a second image (left) and a corresponding quality space diagram (right). The second image 60 shows a subsequent or follow up image of the leg that is acquired in an alignment achieved based on the guidance data from FIG. 3, wherein the guidance data from FIG. 3 served a MRTA as assistance to position the leg of the patient for the second image. The corresponding rotation angle 1 and rotation angle 2 of the second image are determined via analysis algorithm, as described in FIG. 3. The polygon 26 relates to the quality of the first image 20 and the polygon 62 relates to the quality of the second image 60. Both polygons 26, 62 show almost the same rotation angle 1 and rotation angle 2. Hence, the first image 20 and the second image 60 of the follow up examination provide a high comparability.

Figure 6:
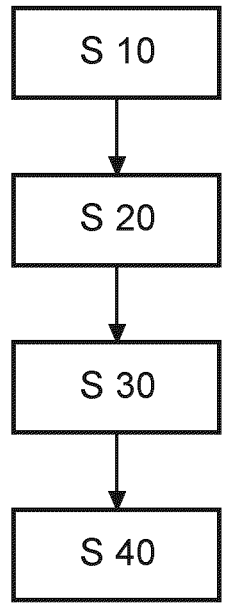
FIG. 6 is a schematic view of the method according to a first embodiment of the present disclosure.

FIG. 6 is a schematic view of the method according to a first embodiment of the present disclosure.

The computer-implemented method for positioning a subject in medical imaging, comprises as first step S10 receiving a first image of a region of interest of the subject. The first image may be received via receiving unit or a corresponding interface. The first image may comprise a DICOM format. The first image may be acquired with an X-Ray tube or CT. The first image may be provided from a data base of a hospital or a cloud server.

In a second step S20 the first positioning data based on the first image are determined, wherein the first positioning data indicates an alignment of the region of interest relative to a first image acquisition unit used to acquire the first image. The determining of the first positioning data comprises reading the first positioning data from meta data of the first image, wherein the meta data of the first image comprises the positioning data, e.g. rotation angle 1 and rotation angle 2 and the ID of the patient. Alternatively positioning data of the first image is determined using an analysis algorithm. The analysis algorithm may include segmenting at least a portion the first image. Additionally or alternatively the analysis algorithm comprises registering of the first image with an anatomy atlas. The segmentation of the first image may be performed using one or a combination of the following segmentation techniques: region growing, Watershed transform, edge detection, shape model, appearance model and hand-segmentation using user interaction with the graphical user interface. Additionally or alternatively, the segmentation may be performed using an artificial neural network. The segmentation may be performed automatically or interactively (i.e. requiring user intervention). In interactive segmentations, a computer system may receive user input, which is indicative of one or more parameters of a location, an orientation and/or an outer contour of an image region. The artificial neural network may be trained using segmented images, in particular performed by interactive segmentation. The artificial neural network may include an input layer, one or more intermediate layers and an output layer. The artificial neural network may be configured as a convolutional neural network, in particular as a deep convolutional neural network. The atlas may include a statistically averaged anatomical map of one or more body portions. At least a portion of the atlas may be indicative of or may represent a two-dimensional or three-dimensional shape of the region of interest.

In a third step S30 guidance data based on the first positioning data is determined, wherein the guidance data comprises a guidance for an alignment of the region of interest relative to a second image acquisition unit used to acquire a second image from a current alignment to a target alignment, wherein the target alignment is to correspond to that derived from the first positioning data;

In fourth step S40 the guidance data for acquiring the second image is provided.

The guidance data comprises a visual representation of the current alignment and the target alignment. The visual representation may displayed on a screen in image acquisition room. The visual representation may show an optical path resulting from the alignment. The visual representation of the current alignment and the target alignment may be displayed on the same screen in one window or in separate windows. The guidance data may further comprise a visual representation of the region of interest. The visual representation may be a static representation of the region of interest (e.g. knee joint), which is used for all patients. The guidance data may further comprise a visual representation of the image acquisition unit. In this content, the visual representation comprises preferably an absolute value. The absolute value may be for example an angle (e.g. 100 difference between current alignment and target alignment) shown in numbers and/or tables. The visual representation may be continuously updated dependent on the current alignment. The guidance data may further comprise a sequence recommendation for adapting the positioning data. The guidance data may further comprises a preview image of the region of interest based on the current alignment, and wherein the preview image is a simulated image that would be acquired with the current alignment in an actual image acquisition using the second image acquisition unit. The simulated image may be derived by a 3D model of the region interest and current alignment. The 3D model of the region of interest may be a static average model that fits for every person independent from personal data or a dynamic model that is adapted in dependency of personal data of a patient (e.g. gender, age, height, etc.). Based on the current alignment and 3D model a calculation algorithm calculates a forward projection that would be imaged in case for the current alignment in reality. The preview image may be continuously updated dependent on the current alignment.

In another exemplary embodiment, a computer program or computer program element is provided that is characterized by being configured to execute the method steps of the method according to one of the preceding embodiments, on an appropriate system.

The computer program element might therefore be stored on a data processing unit, which might also be part of an embodiment. This data processing unit may be configured to perform or induce performing of the steps of the method described above. Moreover, it may be configured to operate the components of the above described device and/or system. The computing unit can be configured to operate automatically and/or to execute the orders of a user. A computer program may be loaded into a working memory of a data processor. The data processor may thus be equipped to carry out the method according to one of the preceding embodiments.

Further, the computer program element might be able to provide all necessary steps to fulfill the procedure of an exemplary embodiment of the method as described above. According to a further exemplary embodiment of the present invention, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It is noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and the foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

LIST OF REFERENCE SIGNS 10 schematic
11 sketched side view
12 real side view
13 sketched front view
14, 16, 17 region of interest
1, 19 radiation path
15 X-ray detector
18 rotation angle
20 first image
21, 61 quality space diagram
22, 23, 24, 25 screw
26 polygon representing the first image
27, 28, 63, 64 axis positioning data
41, 42 visual representation
43 coordinate system
44, 50 visual representation of region of interest
45, 48 visual representation of current alignment
46, 49 visual representation of target alignment
47, 51 visual representation of rotation angle
60 second image
62 polygon representing the second image 70 device
71 receiving unit
72 first determining unit
73 second determining unit
74 providing unit

The invention claimed is:

1. A computer-implemented method for positioning a subject in medical imaging, comprising:
   receiving a first image of a region of interest of the subject;
   determining first positioning data based on the first image, wherein the first positioning data indicates an alignment of the region of interest relative to a first image acquisition unit used to acquire the first image;
   determining guidance data based on the first positioning data, wherein the guidance data comprises a guidance for an alignment of the region of interest relative to a second image acquisition unit used to acquire a second image from a current alignment of the region of interest to the second image acquisition unit to a target alignment of the region of interest to the second image acquisition unit, wherein the target alignment corresponds to an alignment of the region of interest relative to a first image acquisition unit derived from the first positioning data;
   providing the guidance data for acquiring the second image.

2. The method according to claim 1, wherein the first positioning data comprises at least one of: an axis, an angle, a distance, a collimation opening, and a central beam intersection with bond and flexion of the region of interest.

3. The method according to claim 1, wherein the determining the first positioning data comprises:
   reading the first positioning data from meta data of the first image, wherein the meta data of the first image comprises at least the positioning data of the first image; and/or
   analyzing the first image using an image analysis algorithm.

4. The method according to claim 1, wherein providing the guidance data comprises at least one visual representation of the current alignment and/or the target alignment.

5. The method according to claim 1, wherein providing the guidance data comprises at least a visual representation of the region of interest.

6. The method according to claim 4, wherein the visual representation comprises an absolute value.

7. The method according to claim 4, wherein the visual representation is continuously updated dependent on the current alignment.

8. The method according to claim 1, wherein the guidance data comprises a preview image of the region of interest based on the current alignment, and wherein the preview image is a simulated image that would be acquired with the current alignment in an actual image acquisition using the second image acquisition unit.

9. The method according to claim 1, wherein the first image acquisition unit and the second image acquisition unit utilize a same image acquisition technique.

10. The method according to claim 1, wherein the current alignment is derived from at least one optical sensor and/or a control signal of the first image acquisition unit and/or the second image acquisition unit.

11. The method according to claim 1, wherein the current alignment is a simulated representation thereof.

12. The method according to claim 1, further comprising calculating a subtraction image between the first image and the second image, wherein the subtraction image comprise one or more positional differences between the first image and the second image.

13. The method according to claim 12, further comprising highlighting the one or more positional differences in the first image and/or the second image.

14. A device for positioning a subject in medical imaging, comprising:
   a receiver configured to receive a first image of a region of interest of the subject;
   at least one processor configured to:
      determine first positioning data based on the first image, wherein the first positioning data indicates an alignment of the region of interest relative to a first image acquisition unit used to acquire the first image;
      determine guidance data based on the first positioning data, wherein the guidance data comprises a guidance for an alignment of the region of interest relative to a second image acquisition unit used to acquire a second image from a current alignment of the region of interest to the second image acquisition unit to a target alignment of the region of interest to the second image acquisition unit, wherein the target alignment is to correspond to an alignment of the region interest relative to a first image acquisition unit derived from the first positioning data;
      provide the guidance data for acquiring the second image.

15. A non-transitory computer-readable medium for storing executable instructions, which cause a method to be performed to position a subject in medical imaging, the method comprising:
   receiving a first image of a region of interest of the subject;
   determining first positioning data based on the first image, wherein the first positioning data indicates an alignment of the region of interest relative to a first image acquisition unit used to acquire the first image;
   determining guidance data based on the first positioning data, wherein the guidance data comprises a guidance for an alignment of the region of interest relative to a second image acquisition unit used to acquire a second image from a current alignment of the region of interest to the second image acquisition unit to a target alignment of the region of interest to the second image acquisition unit, wherein the target alignment corresponds to an alignment of the region of interest relative to a first image acquisition unit derived from the first positioning data;
   providing the guidance data for acquiring the second image.

* * * * *